United States Patent
Bikumala et al.

(10) Patent No.: US 10,749,818 B1
(45) Date of Patent: Aug. 18, 2020

(54) ELECTRONIC MAIL COMMUNICATIONS (71) Applicant: Dell Products L.P., Round Rock, TX (US)

(72) Inventors: Sathish K. Bikumala, Round Rock, TX (US); Neha Wadhwani, Round Rock, TX (US)

(73) Assignee: Dell Products L.P., Round Rock, TX (US)

(*) Notice: Subject to any disclaimer, the term of this patent is extended or adjusted under 35 U.S.C. 154(b) by 49 days.

(21) Appl. No.: 15/887,099

(22) Filed: Feb. 2, 2018

(51) Int. Cl.
H04L 12/58 (2006.01)
G06N 20/00 (2019.01)
G06F 40/20 (2020.01)

(52) U.S. Cl.
CPC .............. *H04L 51/02* (2013.01); *G06F 40/20* (2020.01); *G06N 20/00* (2019.01); *H04L 51/08* (2013.01); *H04L 51/20* (2013.01); *H04L 51/22* (2013.01)

(58) Field of Classification Search
CPC ......... H04L 51/02; H04L 51/08; H04L 51/20; H04L 51/22; G06N 20/00; G06F 17/27
See application file for complete search history.

(56) References Cited

U.S. PATENT DOCUMENTS

| | | | | |
|---|---|---|---|---|
| 6,988,128 B1* | 1/2006 | Alexander | ........... | G06Q 10/109 709/206 |
| 2002/0099775 A1* | 7/2002 | Gupta | .................. | G06Q 10/107 709/205 |
| 2006/0031324 A1* | 2/2006 | Chen | .................... | G06Q 10/107 709/206 |
| 2006/0224621 A1* | 10/2006 | Findley | ................ | G06Q 10/107 |
| 2012/0065963 A1* | 3/2012 | Bangalore | ........... | G06F 17/2785 704/9 |
| 2012/0072518 A1* | 3/2012 | Tanumihardja | ........ | G06Q 10/10 709/206 |
| 2012/0185797 A1* | 7/2012 | Thorsen | ................ | G06Q 10/00 715/784 |
| 2012/0315880 A1* | 12/2012 | Peitrow | ................. | H04M 1/642 455/412.1 |
| 2014/0113549 A1* | 4/2014 | Beg | ........................ | H04W 4/12 455/41.1 |
| 2015/0244666 A1* | 8/2015 | Pascal | ................... | H04L 51/066 709/206 |

(Continued)

OTHER PUBLICATIONS

D, Derks et al., "Emoticons and Online Message Interpretation," Social Science Computer Review, Aug. 2008, pp. 379-388, vol. 26, No. 3.

(Continued)

*Primary Examiner* — Chris Parry
*Assistant Examiner* — Chouat Abderrahmen
(74) *Attorney, Agent, or Firm* — Ryan, Mason & Lewis, LLP (57) ABSTRACT

A method includes receiving an email on a first email client, providing a user interface on the first email client, wherein the user interface displays a plurality of potential responses to the email, and receiving a selection by a user on the user interface of a response of the plurality of potential responses. The method also includes automatically transmitting a reply to the email to an email server of a second email client in response to the selection of the response. The plurality of potential responses can comprise at least one of a single word, a single phrase, a single sentence, an emoticon and an emoji.

15 Claims, 7 Drawing Sheets

(56) References Cited

U.S. PATENT DOCUMENTS

2015/0341300 A1   11/2015  Swain et al.
2017/0161372 A1    6/2017  Fernández et al.
2017/0222961 A1*  8/2017  Beach .................... H04L 51/16
2018/0006983 A1    1/2018  Steplyk et al.

OTHER PUBLICATIONS

Selena Larson, "Emoji Can Lead to Huge Misunderstandings, Research Finds," The Daily Dot, https://www.dailydot.com/debug/emoji-miscommunicate/, Apr. 11, 2016, 13 pages.

* cited by examiner

ELECTRONIC MAIL COMMUNICATIONS

FIELD

The field relates generally to email processing systems, and more particularly to techniques for generation and receipt of short form email responses.

BACKGROUND

Dependency on electronic email ("email") continues to increase, as email has become the largest communication medium in business and corporate settings. For every group email, many follow-up emails may be generated. For example, it is common to see an average of over ten email responses in connection with a group email. This average increases proportionality with respect to the number of people copied on the email.

A large number of email responses sent can be expressed with a single word, phrase or sentence. In addition, every sent email increases inbox clutter for every recipient in a chain of emails. Receiving and responding to emails can also lower productivity by, for example, distracting receivers with unnecessary inbox notifications, and with the details of composing a response. In some cases, a user may be obliged to respond to emails to avoid wrong assumptions which can be attributed to the lack of a response, which in turn drives up the unwanted email traffic. For example, not sending a response to "Thank you" emails or to emails including a congratulatory notice may be problematic for some.

There are some conventional plug-ins, newsletters, and training courses which have been used to help better manage emails and improve email etiquette. These conventional techniques and/or applications suggest abstaining from responding to emails, and instead using other forms of communication, such as voice, texting or instant messaging. However, similar problems and abuses, such as over usage and distractions, also occur when using the alternate modes of communication.

SUMMARY

Illustrative embodiments of the present invention provide techniques for handling of short form email responses. Such techniques in some embodiments advantageously eliminate traditional steps required to respond to and send email. For example, embodiments of the present invention reduce the number of actions (e.g., keystrokes, mouse clicks, pointing, touchscreen contacts, etc.) required to generate and transmit email responses between parties.

In one embodiment, a method comprises receiving an email on a first email client, providing a user interface on the first email client, wherein the user interface displays a plurality of potential responses to the email, receiving a selection by a user on the user interface of a response of the plurality of potential responses, and automatically transmitting a reply to the email to an email server of a second email client in response to the selection of the response. The method is performed by at least one processing device comprising a processor coupled to a memory.

By, for example, maintaining one or a limited number of copies of an email on an email client or server, and showing only count increases and not new emails for different types of responses from multiple recipients, embodiments of the present invention provide for voluminous email communication without increasing the number of emails appearing in an inbox. Embodiments of the present invention reduce traffic on email servers through response consolidation, and by storing responses on a server in a condensed format. Embodiments of the present invention also facilitate execution of analytics of email responses, and permit users to access summaries of multiple responses on demand.

These and other illustrative embodiments include, without limitation, methods, apparatus, networks, systems and processor-readable storage media.

DETAILED DESCRIPTION

Illustrative embodiments will be described herein with reference to exemplary email processing systems and associated host devices, storage devices and other processing devices. It is to be appreciated, however, that embodiments are not restricted to use with the particular illustrative system and device configurations shown. Accordingly, the term "email processing system" as used herein is intended to be broadly construed, so as to encompass, for example, processing systems comprising cloud computing and storage systems, as well as other types of processing systems comprising various combinations of physical and virtual computing resources. An email processing system may therefore comprise, for example, a cloud infrastructure hosting multiple tenants that share cloud computing resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather are respectively controlled and managed by third-party cloud providers, are typically considered "public clouds." Examples of public clouds may include, but are not limited to, Amazon Web Services® (AWS), Google Compute Engine® (GCE), and Windows Azure® Services platforms. Thus, enterprises can choose to host their applications or services on private clouds, public clouds, and/or a combination of private and public clouds (hybrid clouds) with a vast array of computing resources attached to or otherwise a part of the infrastructure.

In addition to the problems noted in the background section above, electronically generated customer satisfaction (CSAT) surveys, which are sent via email to customers when enterprises resolve customer issues, are often ignored. The electronically generated CSAT surveys seek feedback on how the resolution services were provided by the enterprise personnel (e.g., IT/Tech-Support personnel), and are provided to a user by sending an invitation email with a link to a third party website where the survey is actually hosted. The survey rates are low due to a variety of issues, such as a lack of seamlessness requiring a number of steps to access and respond to the survey.

Other problems exist with emailed organizational announcements, newsletters, etc., which are meant for multiple recipients. Often, these messages are one sided and the sender cannot gauge the responses of the wide audience. For example, recipients may not respond to the emailed organizational announcements, newsletters, etc., and/or the sender does not have the time or resources to read each recipient response.

Illustrative embodiments overcome the above and other drawbacks associated with current email systems by reducing email traffic, and providing added functionality and features to email services. More particularly, illustrative embodiments allow users to install a customized plug-in on their email client (e.g., Microsoft® Outlook®) that enables users to convey short responses (e.g., single words, single phrases, single sentences, an emoticon or an emoji) without actually going through the steps to send an email in a traditional way. In addition, for users receiving the short responses for an existing email, the system treats these responses not as new email, but instead increases a counter corresponding to an appropriate response icon displayed on a new custom tab on the email interface.

The following are some illustrative and non-limiting examples of short responses that can be communicated using embodiments of the present invention: "I agree/I don't agree"; "Thank you"; "Keep it up"; "Good luck"; "I like it/I don't like it"; "Thumbs up/down"; "Accept/Reject"; "Makes sense/doesn't makes sense"; "Read it/Saw it"; "Will Respond later with eta/timestamp"; "Angry/Happy"; "Meet me at a place"; "Not in a mood for this"; "Kudos/Good job"; "Good partnership"; "Congratulations"; "Get well soon", etc.

As used herein, an "emoticon" refers to a pictorial representation of a facial expression by using typographical characters, such as, for example, punctuation marks, numbers and letters, to express, for example, feelings or mood. The first ASCII emoticons, :-) and :-(, were developed in 1982.

As used herein an "emoji" refers to an electronically generated ideogram, smiley (e.g., stylized representation of a smiling humanoid face) or other image used in place of words to convey, for example, feelings, mood, a message, idea or concept. Emoji include, but are not necessarily limited to, images of facial expressions, common objects, hand gestures, places, types of weather and animals. Emoji are similar to emoticons, but emoji are actual pictures instead of typographical characters.

As used herein, "real-time" refers to output within strict time constraints. Real-time output can be understood to be instantaneous or in the order of milliseconds or microseconds. Real-time output can occur when the connections with a network are continuous and a user device receives messages without any significant time delay. Of course, it should be understood that depending on the particular temporal nature of the system in which an embodiment of the invention is implemented, other appropriate timescales that provide at least contemporaneous performance and output can be achieved.

As used herein, a "plug-in" or "add-on" refers to a software component that adds new features to an existing computer program. According to an embodiment of the present invention, a plug-in or add-on also permits one or more of the features to be customized by a user.

Illustrative embodiments allow email users to receive communications without having to manage increasing email volume, as responses received in accordance with embodiments of the present invention are not creating additional emails in an inbox. In accordance with an aspect of the present invention, when there are short responses (e.g., single words, phrases, sentences, emoticons or emoji responses) from recipients of an email, the short responses are automatically pushed to an email server, and counts of the respective responses, which can be organized by type (e.g., approval, disapproval, acceptance, rejection, etc.) are pulled from an email server in order to update response counters on a user's interface. According to an aspect of the present invention, an email user can also have a summary of all of the short responses exported into a file (e.g., a spreadsheet) directly from the email server.

Illustrative embodiments further address the noted drawbacks in connection with electronically generated CSAT surveys by allowing users to take the survey directly in the email, without having to go through a third party survey web site, which will ultimately improve response rates.

Figure 1:
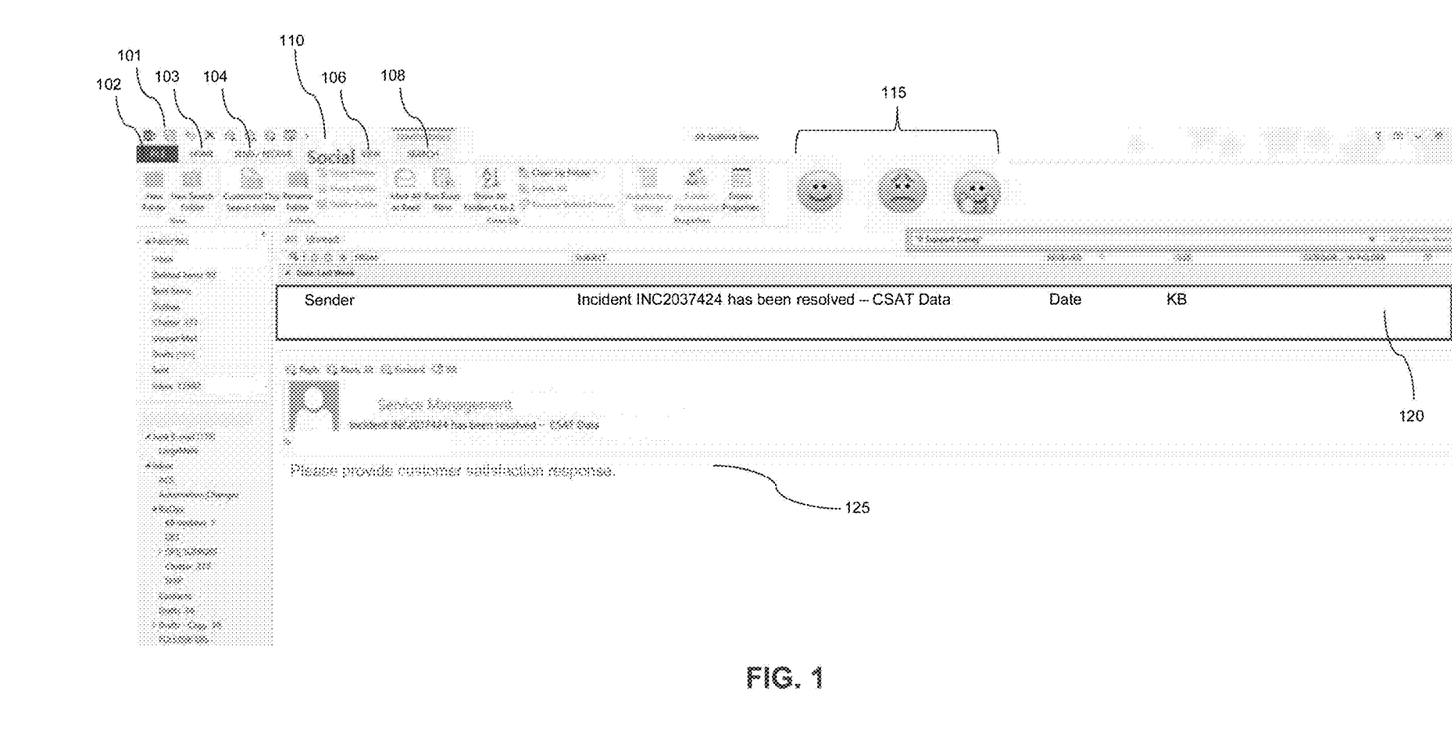
FIG. 1 shows a screen view of an exemplary email client interface for a recipient of emails in an illustrative embodiment of the invention.

FIG. 1 shows a screen view of an exemplary email client interface for a recipient of emails in an illustrative embodiment of the invention. Referring to FIG. 1, a screen view of an email client interface 101, such as, for example, a graphical user interface (GUI) is shown. The interface 101 includes a number of tabs, such as, for example, file 102, home 103, send/receive 104, view 106 and search 108 tabs, which when clicked on, using, for example, a mouse (or pointer, stylus, finger on a mobile device, etc.) provide users with expanded functionality related to tasks associated with each tab. In accordance with an embodiment of the present invention, the interface includes a tab 110, which provides users with expanded functionality related to the short responses of aspects of the present invention. As shown in FIG. 1, the tab 110 is labeled "Social", but is not limited thereto, and may be labeled under an appropriate title which corresponds to the functions thereof.

Once the tab 110 is engaged, a user, such as, for example, an individual responding to an email, is able to view a plurality of short responses 115, which can include, but are not necessarily limited to, single words, phrases, sentences, emoticons and/or emoji responses. As shown in FIG. 1, the short responses 115 include emoji corresponding to a happy/smiling face, sad/frowning face and happy/smiling face with a thumbs up picture. The short responses 115 are not limited thereto, and can include any number and combination of single words, phrases, sentences, emoticons and/or emoji. FIG. 1 further illustrates email details 120, including, for example, the sender details, email subject, email received date, and size, and the email 125, including text of the email, as well as the sender details.

In FIG. 1, the email 125 is seeking one or more responses to an electronic survey, such as, for example, a CSAT survey. CSAT surveys are sent by email to thousands or millions of customers per month. Embodiments of the present invention permit users (e.g., recipients of an email seeking a survey response) to respond to the survey directly through the email and not by going through a third party website. Instead, a user can respond to survey questions by using the short responses 115 provided on the user's email interface. For example, the user can respond to each survey question by clicking on (e.g., with a mouse, pointer, stylus, finger on a mobile device, etc.) one of the short responses 115 which are part of the interface 101. For example, if the survey requires a single answer, the response answer (i.e., the selected short response 115) is selected directly on the email client interface 101 using one of the short response icons 115 and sent to the sender of the survey email 125 without the user having to create an email response or send the response by clicking on a "send" icon on the user interface 101. Accordingly, responding to the survey and sending the email reply can be performed with, for example, one click, which is an improvement over existing techniques for responding to emails, which require typing a response and multiple clicks. If the survey has multiple questions, each answer is selected by selecting one of the short response icons 115, each response is recorded, and the recorded responses are automatically sent once the user selects the response to the last question, without the user having to create an email response or send the response by clicking on a "send" icon on the user interface 101.

As a result, the embodiments of the present invention eliminate a need for a survey tool provided from a third party service provider, reduce survey overhead, increase electronic survey response rates, and improve user engagement and/or interest in surveys.

Embodiments of the present invention also facilitate analysis of survey responses. As explained further herein in connection with FIG. 2A, the senders of the surveys can see survey short responses on their respective email interfaces in the form of counted responses which correspond to each of the survey short responses 115 selected by recipients of the survey. For example, survey senders can have the same or similar short response icons 115 on their email interfaces, and the sender of the survey will see a numerical count on their interfaces corresponding to a number of survey responders selecting a particular response. In connection with the illustrative example in FIG. 1, for each recipient that selects the happy/smiling face indicating a level of satisfaction with the service, the happy/smiling face with a thumbs up picture indicating a higher level of satisfaction with the service, or the sad/frowning face indicating dissatisfaction with the service, the counts corresponding to the selected responses will increase on the sender's interface to give the sender a quick and accurate view of whether users are satisfied with their service.

Accordingly, embodiments of the present invention reduce the amount of effort needed for survey analytics, reduce email traffic in connection with surveys, and immediately capture customer feelings and/or impressions following a service event. The embodiments of the present invention are not necessarily limited to feedback in the form of surveys, and may also be applied to other types of situations, such as, for example, employee evaluations and/or other types of feedback within an organization or enterprise.

Figure 2A:
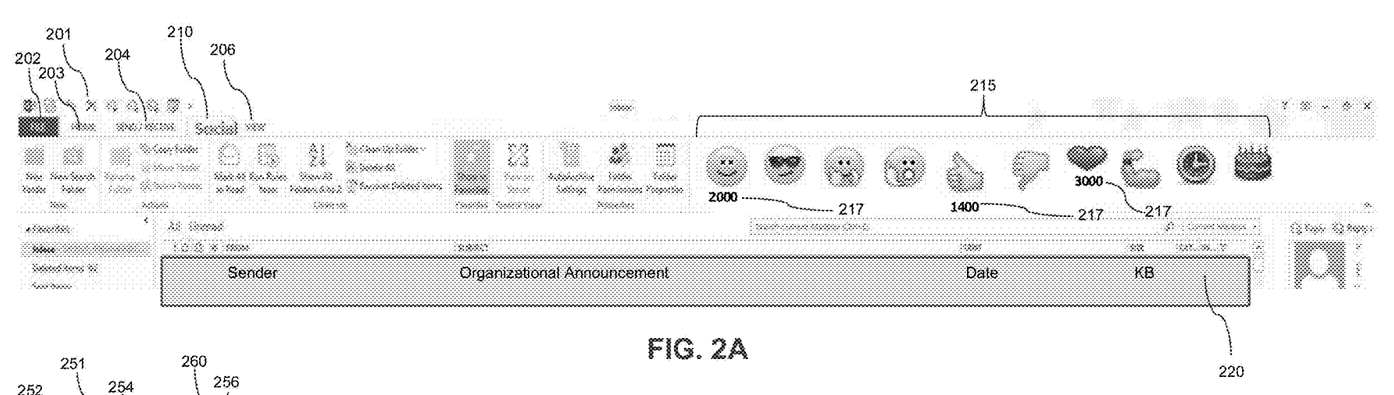
FIG. 2A shows a screen view of an exemplary email client interface for a sender of emails in an illustrative embodiment of the invention.
Figure 2B:
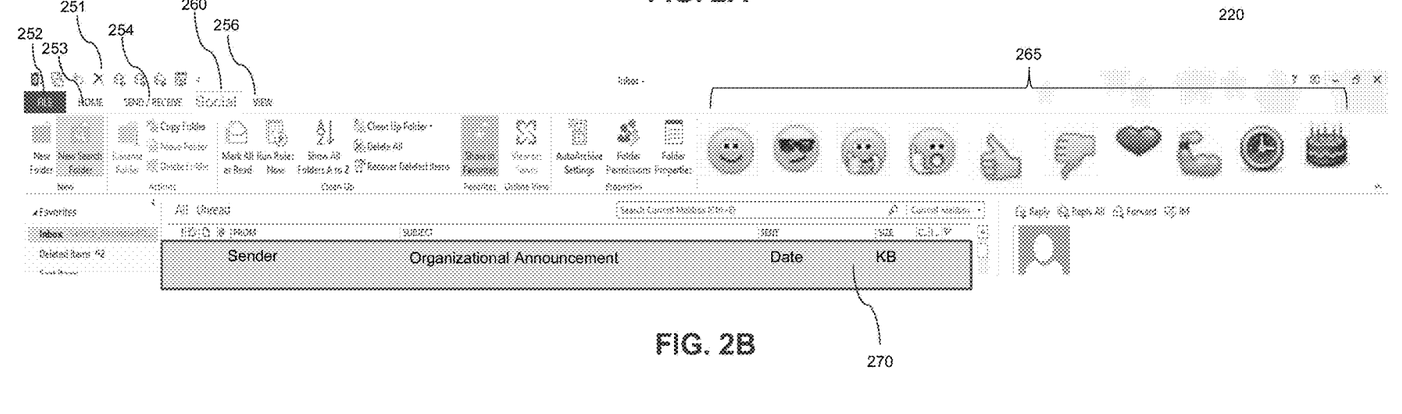
FIG. 2B shows a screen view of an exemplary email client interface for a recipient of emails in an illustrative embodiment of the invention.

FIGS. 2A and 2B show screen views of exemplary email client interfaces for a sender and a recipient of emails in an illustrative embodiment of the invention. Referring to FIGS. 2A and 2B, screen views of email client interfaces 201 and 251 for a sender and a recipient of an email, respectively, are shown. Similar to what is described in connection with FIG. 1, the interfaces 201 and 251 include a number of tabs, such as, for example, file 202, 252, home 203, 253, send/receive 204, 254 and view 206, 256 tabs, which when clicked on, using, for example, a mouse (or pointer, stylus, finger on a mobile device, etc.), provide users with expanded functionality related to tasks associated with each tab. In accordance with an embodiment of the present invention, the interfaces each include a tab 210, 260 which provides users with expanded functionality related to the short responses of aspects of the present invention. As shown in FIGS. 2A and 2B, the tabs 210, 260 are each labeled "Social", but are not limited thereto, and may be labeled under an appropriate title which corresponds to the functions thereof.

Once the tabs 210, 260 are engaged, a user, such as, for example, an individual receiving a response or responding to an email, is able to view a plurality of short responses 215, 265 which can include, but are not necessarily limited to, single words, phrases, sentences, emoticons and/or emoji responses. As shown in FIGS. 2A and 2B, the short responses 215, 265 include emoji corresponding to a happy/smiling face, a happy/smiling face wearing sunglasses, a happy/smiling face with a thumbs up picture, a surprised face, thumbs up and thumbs down images, a heart, an image of a muscled arm, a clock and a birthday cake. The short responses 215, 265 are not limited thereto, and can include any number and combination of single words, phrases, sentences, emoticons and/or emoji. FIGS. 2A and 2B further illustrate email details 220, 270 including, for example, the sender details, email subject, email received date, and size.

In FIGS. 2A and 2B, the email includes an organizational announcement, such as, for example, a congratulatory notice (e.g., promotion, new position, etc.), retirement announcement, scheduling notice, announcement regarding a successful product launch, policy change notice, etc. Often, such an email including an organizational announcement may be sent from a sender to multiple recipients, such as all or a large number of the employees of an organization or enterprise.

Embodiments of the present invention permit a recipient of the organizational announcement to respond to the email by using the short responses 265 provided on the recipient's email interface. For example, once the recipient reads the email, the recipient can respond by clicking on (e.g., with a mouse, pointer, stylus, finger on a mobile device, etc.) one of the short responses 265 which are part of the interface 251. For example, if the recipient has a positive response to the email, the recipient can click on one of the positive emoji (e.g., happy/smiling face, happy/smiling face wearing sunglasses, happy/smiling face with a thumbs up picture, thumbs up image, heart, or image of the muscled arm). Alternatively, if the recipient has a negative response to the email, the recipient can click on one of the negative emoji (e.g., surprised face, thumbs down image). Using the tab 260, the recipient can directly select a desired short response icon 265 on the email client interface 251, which can be sent to the sender of the email upon selection without the user having to create an email response or send the response by clicking on a "send" icon on the user interface 251. Accordingly, responding to the email and sending the email reply can be performed with, for example, one click, which is an improvement over existing techniques for responding to emails, which require typing a response and multiple clicks.

Embodiments of the present invention facilitate receipt and analysis of responses to the organizational announcement email on the sender end. Referring to FIG. 2A, senders of organizational announcement emails can see short responses 215 on their respective email interfaces in the form of counted responses which correspond to the short responses 265 selected by recipients of the organizational announcement email. For example, senders can have the same or similar short response icons 215 on their email interfaces 201, and the sender of the survey will see a numerical count 217 associated with a particular icon 215 corresponding to a number of recipients selecting a particular response. In connection with the illustrative example in FIG. 2A, the interface 201 on the sender's email client indicates that 2000 recipients selected the happy/smiling face, 1400 recipients selected the thumbs up image, and 3000 recipients selected the heart image, indicating, in general, approval with the announcement at different levels. The counts 217 will increase on the sender's interface with each response to give the sender a quick and accurate view of recipients' impressions of the announcement. Embodiments of the invention, therefore, eliminate the need for the sender to review or read individual emails from each of the recipients. In keeping with the illustrative example, instead of reading 6400 recipient emails, the email processing system in accordance with embodiments of the present invention, dynamically display the counts 217 of the recipients' short responses for the sender when the sender views the sent organizational announcement email. The counts 217 change in real-time with each received short response from a recipient. According to an aspect of the present invention, the counts 217 may only be visible to a user when the corresponding icon is clicked on or a pointer associated with a mouse (or pointer, stylus, finger on a mobile device, etc.) is hovered over the corresponding icon. In accordance with an embodiment of the present invention, an email client maintains one email for a plurality of responses instead of having an email for each response.

Accordingly, embodiments of the present invention reduce the amount of effort needed for response analytics, reduce email traffic and required storage in connection with organizational announcements, and immediately capture recipient feelings on and/or impressions of the organizational announcement. The embodiments of the present invention are not necessarily limited to organizational announcements, and may also be applied to other types of situations, such as, for example, emails between friends, family, groups, teams, etc. where short responses may be appropriate.

Embodiments of the present invention further address problems associated with compatibility between different email clients, image support and differences between languages and/or cultures. For example, different email client platforms may use different images to represent the same emotion or concept. For example, a happy face emoji may look different on respective platforms and convey different messages, increasing the chance of miscommunication between individuals with different platforms when using certain emoji. In accordance with an embodiment of the present invention, when a user clicks on the short response (e.g., one of the short responses 115, 265), the email handling system associated with the corresponding interface 101, 251 generates a textual translation of the selected emoji (e.g., "grinning face") that is transmitted with the response to an email client of a recipient running on a different platform. A handling system of the email client of the recipient matches the textual translation of the emoji response with an emoji of the email client, and presents the appropriate response (e.g., an increased count for the matched emoji, or a visualization of the matched emoji) to the recipient. The matched emoji may also be presented with the textual translation in case the matched emoji does not readily convey the intended message. The system can be programmed to know which emoji may be problematic in connection with being able to convey an intended message. Alternatively, if the response handling system of the email client of the recipient is unable to match the response with a corresponding emoji of the email client, or does not support emoji or that particular emoji, the response is presented to the recipient in textual form without a corresponding emoji or the system determines an appropriate substitute response (e.g., emoji) based on the original response. In some embodiments, the textual translation can be in the form of meta data transmitted with the response that is used by the system in conjunction with NLP to determine the message being conveyed by the short response.

In another example, embodiments of the present invention are configured to account for differences between languages and cultures. For example, certain types of emotional responses or gestures may have different meanings across different cultures, and/or can be offensive in one culture, while not being offensive in another culture. In accordance with an embodiment of the present invention, a short response (e.g., a hand gesture) received from one email client is automatically evaluated on the receiving client to determine if that short response would be offensive or problematic for a recipient on the receiving client. Upon set up of a plug-in on an email client, preferences can be set to language and region, and the system can be programmed to know which responses are problematic and automatically flag inappropriate responses for the selected language or region. In response to a flagged inappropriate response, the system can substitute an appropriate short response and/or include an acceptable translation of the response that conveys the desired message without being offensive or inappropriate.

Similar to the embodiment described above, when a user clicks on the short response (e.g., one of the short responses 115, 265), the handling system associated with the corresponding interface 101, 251 generates a textual translation of the selected emoji (e.g., "grinning face") that is transmitted with the response to an email client of a recipient running on a different platform. The handling system of the recipient email client can use the textual translation when performing the automatic evaluation to determine if that short response would be offensive or problematic for a recipient on the receiving client. In response to a flagged inappropriate response, the system can use the translation to select a substitute appropriate short response and/or generate an acceptable translation into another language of a response that conveys the desired message without being offensive or inappropriate.

Embodiments of the present invention permit customization of interfaces on email clients. For example, if given short responses as part of the plug-in added to an email client are not sufficient to enable a user to provide a response, a user can create a customized short response (e.g., single word, phrase, sentences, emoticon or emoji) which can be added to the short responses available for selection by a user when replying to an email or survey and/or sent as the reply to an incoming email.

In accordance with an embodiment of the present invention, the presentation and functionality associated with tabs 110, 210 and 260 or other similar presentations and functionality can be furnished as an add-on to an existing email client interface. Alternatively, the presentation and functionality associated with tabs 110, 210 and 260 or other similar aspects can be developed and programmed as part of a new email client interface.

Figure 3:
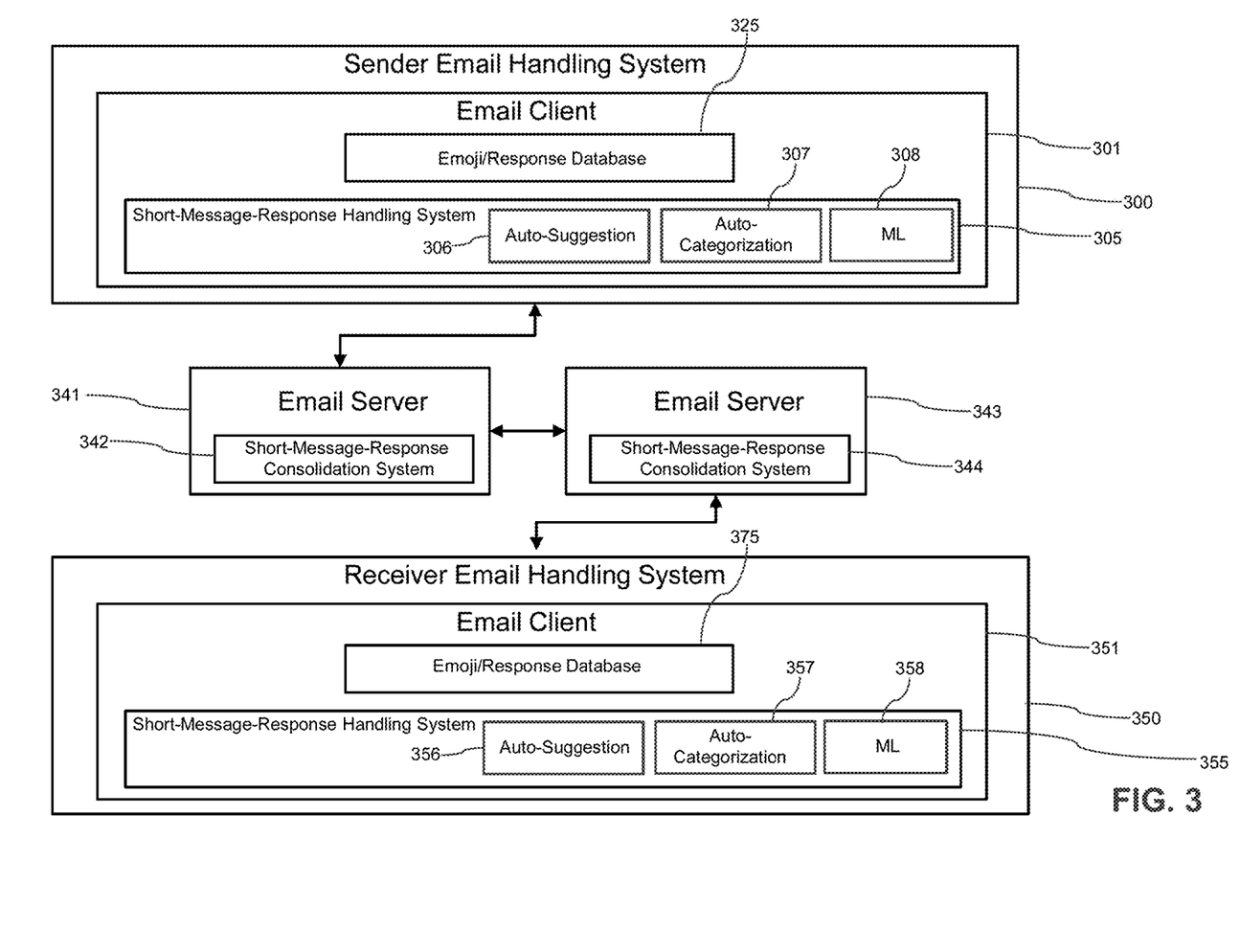
FIG. 3 is a block diagram of an email processing system for generation and receipt of short email responses in an illustrative embodiment of the invention.

FIG. 3 is a block diagram of an email processing system for generation and receipt of short email responses in an illustrative embodiment of the invention. Referring to FIG. 3, an email processing system includes sender and receiver email handling systems 300 and 350, each including an email client 301, 351, such as, for example, Microsoft® Outlook®. Each of the email clients 301 and 351 comprises short-message response handling systems 305, 355 and a response/emoji database 325, 375. The plug-in or add-on installed on the email clients 301 and 351 can include the short-message response handling systems 305, 355 and the response/emoji databases 325, 375. Alternatively, the short-message response handling systems 305, 355 and the response/emoji databases 325, 375 are configured to be part of the original programming of the email clients 301 and 351.

The sender and receiver email handling systems 300 and 350 are connected to each other over one or more networks (not shown) and via at least a first email server 341 of the sender email handling system 300 and a second email server 343 of the receiver email handling system 350. The one or more networks, in some embodiments, are assumed to comprise a global computer network such as the Internet, although other types of networks may be used, including a wide area network (WAN), a local area network (LAN), a satellite network, a telephone or cable network, a cellular network, a wireless network such as a WiFi or WiMAX network, or various portions or combinations of these and other types of networks. The network in some embodiments therefore comprises combinations of multiple different types of networks each comprising processing devices configured to communicate using Internet Protocol (IP) or other related communication protocols.

The email clients may run on user devices, comprising, for example, mobile telephones, laptop computers, tablet computers, desktop computers or other types of devices, in any combination. Such devices are examples of what are more generally referred to herein as "processing devices." Some of these processing devices are also generally referred to herein as "computers." In some embodiments, the user devices are devices utilized by members of an enterprise. For example, the user devices may comprise respective computers associated with a particular company, organization or other enterprise. The email clients 301 and 351 and the features and/or plug-ins thereof may be provided as a service to that enterprise, for use by members thereof.

The email servers 341 and 343 may include SMTP (Simple Mail Transfer Protocol) servers, domain-name servers, web servers, application servers, etc. or other types of servers which provide processes used by the email clients 301 and 351. For example, the servers 341 and 343 may be web servers, application servers, incoming and outgoing mail servers, which provide web-based or other types of applications, services or other functionality for the email clients 301 and 351. In some embodiments, the email servers 341 and 343 are part of a cloud computing network providing services to users of the email clients 301 and 351. The services, applications, functionality or more generally processes provided or otherwise made available to email clients 301 and 351 by servers 341 and 343 vary in complexity as described above. It is to be understood that the number of email clients and servers is merely illustrative and may be more than what is shown in FIG. 3.

The first and second email servers 341 and 343 each include a short-message-response consolidation system 342, 344. In accordance with an embodiment of the present invention, the short-message-response consolidation systems 342, 344 reduce traffic on the email servers 341, 343 by storing responses on the server in a condensed format, whereby a single copy of an email is maintained, and counters for new responses are updated with each additional response. For example, in the case of an organizational announcement email discussed herein above, the original email is stored, and responses to the email are maintained in the form of updated counts indicating the number of each type of response received from a plurality of recipients. According to an aspect of the present invention, instead of keeping each full response to an email, the short-message-response consolidation systems 342, 344 each maintain a dynamic summary of the responses which can be updated with each new response, and allow a user of either of the email clients 301 and 351 to download the summary on demand. The summary can include, for example, categories of the type of responses, and number of responses under each category, as well as information identifying the source of each response. In addition, the short-message-response consolidation systems 342, 344 can be configured to suppress new email alerts for new emails on an existing email thread. This can be useful for organizational announcement type email responses, where thousands of responses may be received.

The short-message response handling systems 305, 355 each include an auto-suggestion component 306, 356, an auto-categorization component 307, 357 and a machine learning component 308, 358. The auto-suggestion components 306/356 automatically suggest short response options, and can also generate salutations/greetings and closings based on various types of information that are collected and analyzed by the machine learning components 308/358 using machine learning techniques. Machine learning techniques may include, but are not necessarily limited to, a Support Vector Machine (SVM), a Multilayer Perceptron (MLP), a deep learning model and a neural network. In accordance with an embodiment of the present invention, the short responses 115, 215 and 265 displayed on a user interface can include programmed short responses, user customized short responses, and automatically generated (suggested) short responses based on collected and analyzed information.

For example, according to an aspect of the present invention, a response message can contain a core message (e.g., short response), a salutation/greeting and a closing, where machine learning techniques are used to automatically suggest the core message, salutation/greeting and closing. In connection with automatically suggesting an appropriate salutation/greeting and closing, the system uses, for example, data mining and natural language processing (NLP) techniques to extract from prior emails and the present email information corresponding to the gender of the sender, relationship between the email sender and responder (e.g., recipient), job/seniority level of the sender compared to the recipient, geographic location, culture and religion of the sender, etc. Additional factors affecting the resulting automatically suggested salutation and/or closing include extracted information regarding the time of the day (e.g., "Have a good evening" if responding closer to evening and "Have a great day" if responding early in the day, such as before noon), as well as the time of year (e.g., holidays, such as major and government holidays, leading to salutations and closings like "Happy holidays", "Happy New Year", "Enjoy the long weekend," etc.). In addition to analyzing the text of prior emails and the present email, the information regarding the time of day and year can be extracted from email timestamps, and a computer's calendar along with a database of corresponding holidays and typical environmental and social conditions related to the time of day or year. A suggested salutation/greeting and/or a closing can be displayed on the user interface of the email client, where a user can select the suggested salutation/greeting and/or a closing by for example, clicking on the selection with a mouse (or pointer, stylus, finger on a mobile device, etc.) to automatically add the selected text to the response.

In accordance with aspects of the present invention, NLP is used by the auto-suggestion component 306/356 to offer personal style response suggestions as a result of analyzing the email body to offer response options. The machine learning component 308/358 maintains a record of what type of responses are sent to what type of emails, such as, for example, "Congratulations on the Promotion", so the suggested response options evolve over time to correspond to the writing habits of the individual responding to the email.

The auto-suggestion component 306/356 creates email response options based on business context. For example, response options may change from one employee to another due to, for example, the employee's business segment (e.g., response options displayed on salesperson's screen may be different from those displayed on the interface of a human resources (HR) employee. The machine learning component 308/358 can learn useful responses for different departments within an enterprise. In accordance with an embodiment of the present invention, the auto-suggestion component accesses job profile information from, for example, an enterprise employee directory, and suggests various options based on seniority levels of the sender and recipient. For example, suggested short responses may be more formal when responding to senior personnel than when responding to equally positioned employees or to employees having less seniority. Suggested short responses can be displayed on the user interface of the email client as options with other short responses.

According to an aspect of the present invention, the auto-suggestion component 306/356 automatically identifies if there is a friendly relationship between senders and receivers, and suggests response options based on the identified relationship. For example, based on previous responses between the parties, and/or the bodies of previous emails and of the present email, the auto-suggestion component 306/356 automatically identifies that the sender and receiver are friends outside of work, and displays informal response options.

According to an aspect of the present invention, in connection with, for example, a scheduling or task-oriented email, the auto-suggestion component 306/356 accesses data from a user's electronic calendar, and tailors the response options to reflect the user's availability. For example, if a user is fully booked for a day with meetings, the short-response options reflect the user's schedule to convey the message that the user is busy the entire day, or will not be able to address any issues until the following day. In addition, if the calendar reflects that there is a meeting coming up between an email sender and recipient, the auto-suggestion component 306/356 proposes response icons/buttons including messages such as "Let's discuss when we meet", this way the recipient can defer his/her response for a meaningful discussion during a scheduled meeting.

The auto-suggestion component 306/356 also uses location information of the sender and/or recipient to suggest response options based on the proximity of the sender and recipient. For example, if the sender is determined to be in the same area as the recipient, then the auto-suggestion component 306/356 may suggest responses such as "Let's meet now", "How about a coffee now" etc.

The auto-suggestion component 306/356 also detects automated "Out of the Office" replies of a recipient, and provides a response option which acknowledges the Out of the Office status, such as, for example, "Meet me when you are back", "Have good time off" etc.

The auto-categorization component 307/357 automatically organizes, groups and creates folders within an email client based on the response used. Since the responses are coming from a limited universe of short response options, organization of emails by response is a useful categorization tool which enables a user to search for emails according to the response used.

The response/emoji databases 325, 375 store possible short responses that may be used as short responses in replying to an email and/or included in a received email from another party. In addition, as responses are created or customized by a user or automatically created or customized by the system, the created/customized responses or automatically created/customized responses are added to the databases 325, 375.

The databases 325, 375 or additional databases may also store information for the email clients 301, 351, their corresponding devices and the short-message handling systems 305, 355, or for particular users thereof. The databases 325, 375 or additional databases in some embodiments are implemented using one or more storage devices associated with the system email handling systems 300 and 350. Such storage devices may comprise, for example, storage products such as VNX® and Symmetrix VMAX®, both commercially available from Dell EMC Corporation of Hopkinton, Mass. A variety of other storage products may be utilized to implement at least a portion of the storage devices in the systems 300 and 350.

According to an aspect of the present invention, the presentation of the short response options can be automatically aligned or automatically sized based on the limitations of the receiving device. For example, the number and/or size of the response options may be reduced if an email is accessed on a smaller mobile device instead of a larger desktop device.

Although not explicitly shown in FIG. 3, one or more input-output devices such as keyboards, displays or other types of input-output devices may be used to support one or more user interfaces to the email clients 301 and 351, as well as to support communication between such elements and other related systems and devices not explicitly shown.

It is to be appreciated that the particular arrangement of the email handling systems 300 and 350, the email clients 301 and 351 and the email servers 341 and 343 in the FIG. 3 embodiment is presented by way of example only, and alternative arrangements can be used in other embodiments. For example, the short-message response handling systems 305 and 355 or portions thereof (e.g., auto-suggestion, auto-categorization and machine learning components 306/

356, 307/357. 308/358) may in some embodiments be implemented at least partially external to one or more of the email clients 301 and 351. As another example, functionality associated with the auto-suggestion, auto-categorization and machine learning components 306/356, 307/357. 308/358 may be combined into one module, or separated across more than three modules with the multiple modules possibly being implemented with multiple distinct processors.

At least portions of the short-message response handling systems 305 and 355 may be implemented at least in part in the form of software that is stored in memory and executed by a processor.

It is to be understood that the particular set of elements shown in FIG. 3 for generation and receipt of short email responses is presented by way of illustrative example only, and in other embodiments additional or alternative elements may be used. Thus, another embodiment may include additional or alternative systems, devices and other network entities, as well as different arrangements of modules and other components.

Figure 4A:
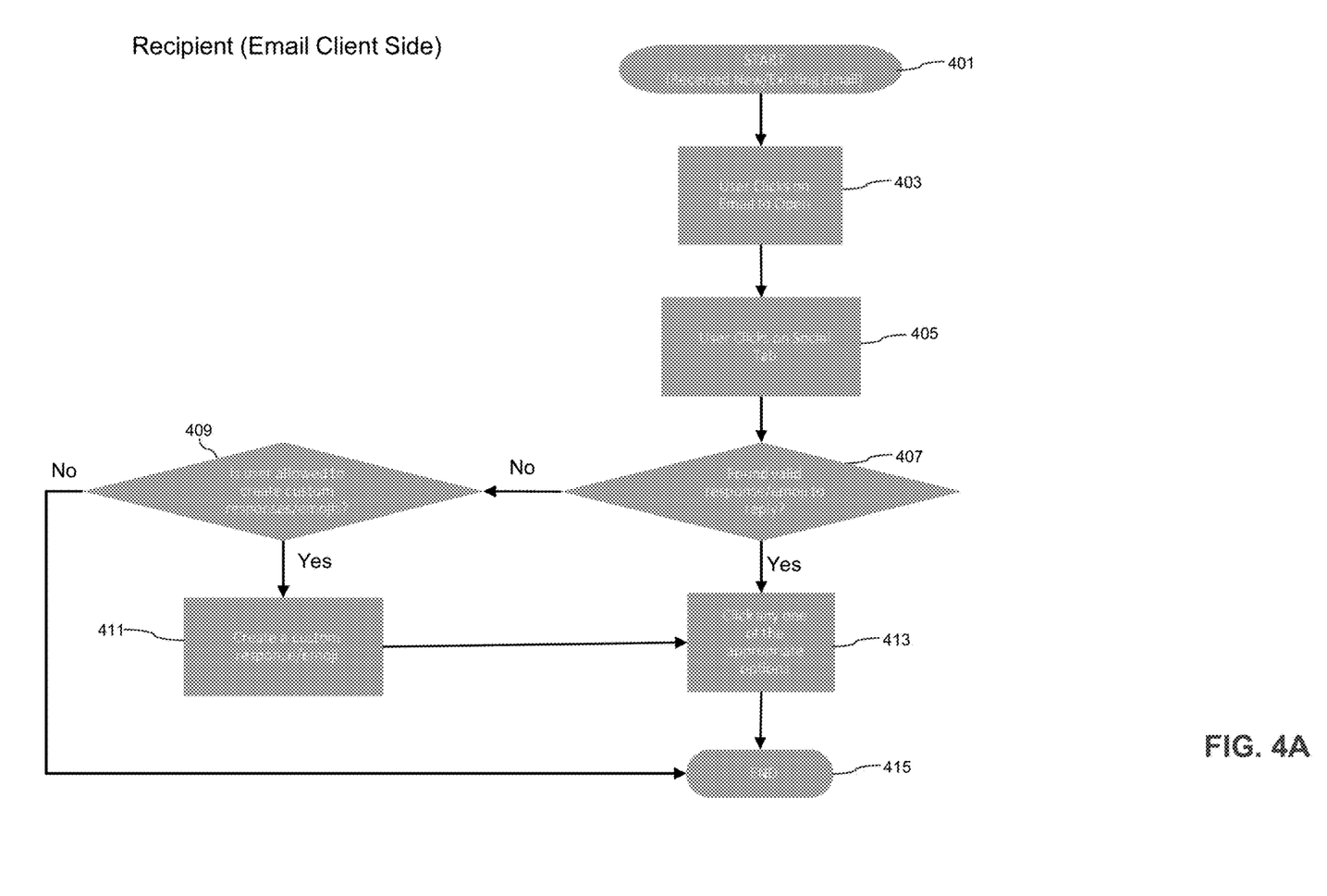
FIG. 4A is a flow diagram of an exemplary process for generation of short email responses in an illustrative embodiment.

FIG. 4A is a flow diagram of an exemplary process for generation of short email responses in an illustrative embodiment. It is to be understood that this particular process is only an example, and that additional or alternative processes for generation of short email responses can be carried out in other embodiments. In this embodiment, the process includes steps 401 through 415. These steps are assumed to be performed by processors of the short-message response handling systems 305 and 355 utilizing auto-suggestion, auto-categorization and machine learning components 306/356, 307/357. 308/358. The process begins with step 401, where a new email or email from an existing thread is received, and advances to step 403 where a user, through an interface on an email client, clicks on the email to open the email, and reads the email. Then, at step 405, the user clicks on a tab, like social tabs 110 and 260 described herein, to find an appropriate short response to the email, such as one of the responses 115 and 265. As discussed herein, the responses from which the user can select can be pre-programmed and/or automatically suggested based on different information gathered from a variety of sources. The responses can be stored in database, such as, for example, database 375.

Referring to step 407, if the user finds a response that the user wants to use, at step 413, the user clicks on the selected short response (e.g., one of the responses 115 and 265) and the response is sent to the sender of the email where the process ends at block 415. Alternatively, referring back to step 407 and to steps 409 and 411, if the user does not find a response that the user wants to use, and is able to create a custom response/emoji, the user creates the custom response/emoji. Then, at step 413, the user clicks on the created response and the response is sent to the sender of the email where the process ends at block 415. The created response can be added to a database, such as for example, database 375. Alternatively, referring to step 409, if the functionality to create a custom response/emoji is not available and a desired short response is not found, the user can end the process by not sending a response, or responding to the email in a traditional manner.

Figure 4B:
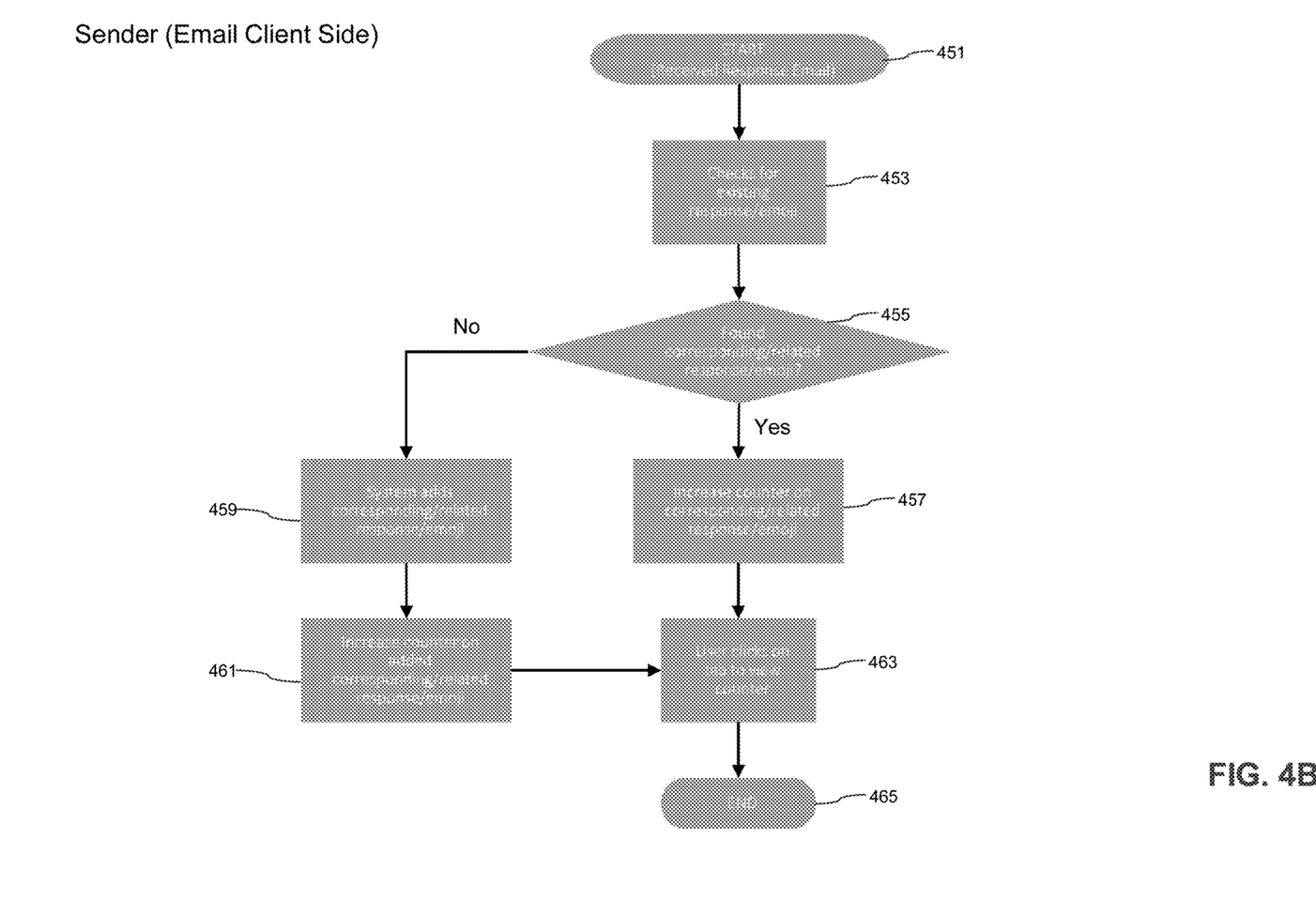
FIG. 4B is a flow diagram of an exemplary process for receipt of short email responses in an illustrative embodiment.

FIG. 4B is a flow diagram of an exemplary process for receipt of short email responses in an illustrative embodiment. It is to be understood that this particular process is only an example, and that additional or alternative processes for receipt of short email responses can be carried out in other embodiments. In this embodiment, the process includes steps 451 through 465. These steps are assumed to be performed by processors of the short-message response handling systems 305 and 355 utilizing auto-suggestion, auto-categorization and machine learning components 306/356, 307/357. 308/358. The process begins with step 451, where a response email from an existing thread is received, and advances to step 453 where the system compares the short response in the incoming email to a database of responses stored, for example in database 325. Referring to steps 455 and 457, if a response that is related or corresponds to the incoming short response is found in the database, then the system increases a counter corresponding to the related response to account for its use in the incoming email. In addition, if the related response is not already part of the interface under the appropriate tab, like social tab 210 described herein, the system adds the related short response to the interface. At step 463, a user clicks on the tab to view the short responses and corresponding counts (e.g., counts 217) to see how the counts have been changed in relation to the short responses, and can see that the count has increased with respect to the related response.

Referring back to step 455 and to step 459, if a response that is related or corresponds to the incoming short response is not found in the database, then the system creates a response which is related or corresponds to the incoming short response and adds it to the database. The system further adds the newly created short response to the interface, and creates a counter for the newly created short response. If the system does not recognize the incoming short response, the system may use a translation appended to the short response and use NLP to determine the nature of the incoming short response, and create the response which is related or corresponds to the incoming short response. Referring to step 461, the system increases the counter corresponding to the created response to account for its use in the incoming email, and at step 463, a user clicks on the tab to view the short responses and corresponding counts (e.g., counts 217) to see how the counts have been changed in relation to the short responses, and can see that the count has increased with respect to the created response. The process ends at step 465.

Figure 5:
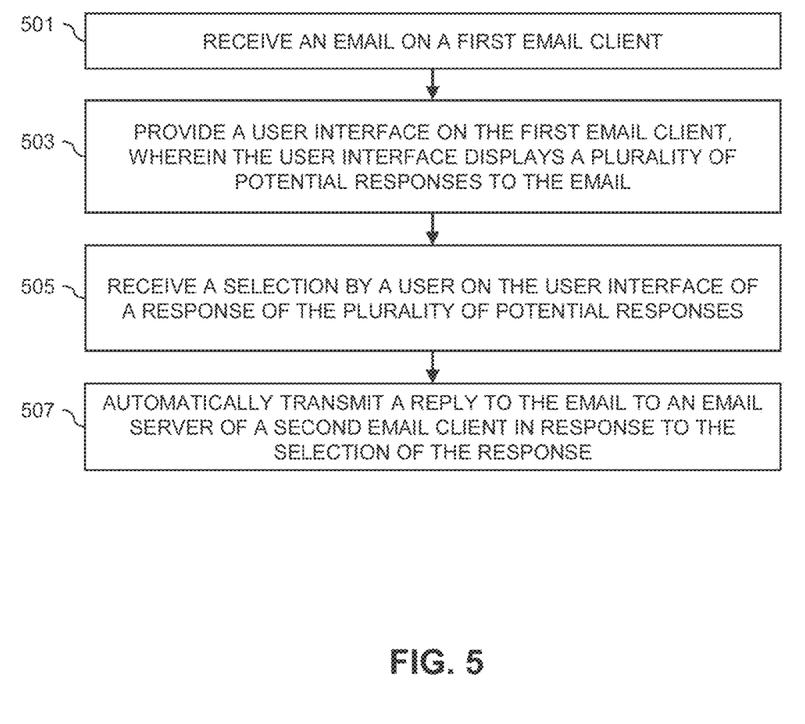
FIG. 5 is a flow diagram of an exemplary process for generation and receipt of short email responses in an illustrative embodiment.

An exemplary process for generation and receipt of short email responses will now be described in more detail with reference to the flow diagram of FIG. 5. It is to be understood that this particular process is only an example, and that additional or alternative processes for generation and receipt of short email responses can be carried out in other embodiments.

In this embodiment, the process includes steps 501 through 507. These steps are assumed to be performed by processors of the short-message response handling systems 305 and 355 utilizing auto-suggestion, auto-categorization and machine learning components 306/356, 307/357. 308/358. The process begins with step 501, where an email is received on a first email client. Referring to step 503, a user interface is provided on the first email client, which displays a plurality of potential responses to the email. As described herein, the plurality of potential responses can include, for example, single word, single phrase, single sentence, emoticon and emoji responses. At step 505 and 507, a user selection of one of the responses of the plurality of responses is received on the user interface, and in response to that selection, a reply to the email is automatically transmitted to an email server of a second email client.

According to an aspect of the present invention, at least one potential response of the plurality of potential responses is automatically generated (e.g., using an auto-suggestion component 306/356), and the automatically generated response is displayed on the user interface for possible selection by the user. The automatic generation of a potential response can be performed using natural language processing and/or machine learning. A relationship between a sender and a recipient of the email (e.g., business relationship, friendly relationship) can be identified, and the automatically generated response can be based on the identified relationship. In another aspect, a position within an enterprise of a recipient of the email can be identified, and the automatically generated response can be based on the identified position. For example, depending on a person's role in an organization, different responses may or may not be relevant for that person.

According to aspects of the present invention, an electronic calendar and/or electronic location information of a recipient of the email are accessed, and availability and/or location of the recipient are identified. The automatically generated response can be based on the identified availability and/or location.

As discussed herein, a user interface is also provided on an email client, which displays one or more of a plurality of potential responses to the email, and a count of a number of received replies to the email including a corresponding response of the displayed plurality of potential responses. When a reply to an email is received on the email client, the reply increases a count of a number of received replies to the email including the selected response, and the user interface of the email client displays the increased count.

According to an aspect of the present invention, reference to an email reply on the second email client is limited to the display of the increased count corresponding to the selected response in that reply. The email client does not show the reply as an additional email. The reply can be consolidated on an email server with other replies to the email received from a plurality of recipients.

In some aspects of the present invention, the system may determine that a selected response should not be displayed to a user of an email client because it may be problematic (e.g., inappropriate or offensive) due to, for example, cultural or language differences between emailing parties. In this case, the system may automatically substitute the selected response with a different response that is based on the selected response, but not deemed to be problematic.

The system may also determine that a selected response is not supported by an email client (e.g., the email client is not programmed to display a particular response/emoji, does not support emoji at all, or due to a different platform, displays a different emoji from another platform to convey the same message). In this case, the system may automatically substitute the selected response with a supported response (e.g., another emoji and/or text) based on the selected response.

Figure 6:
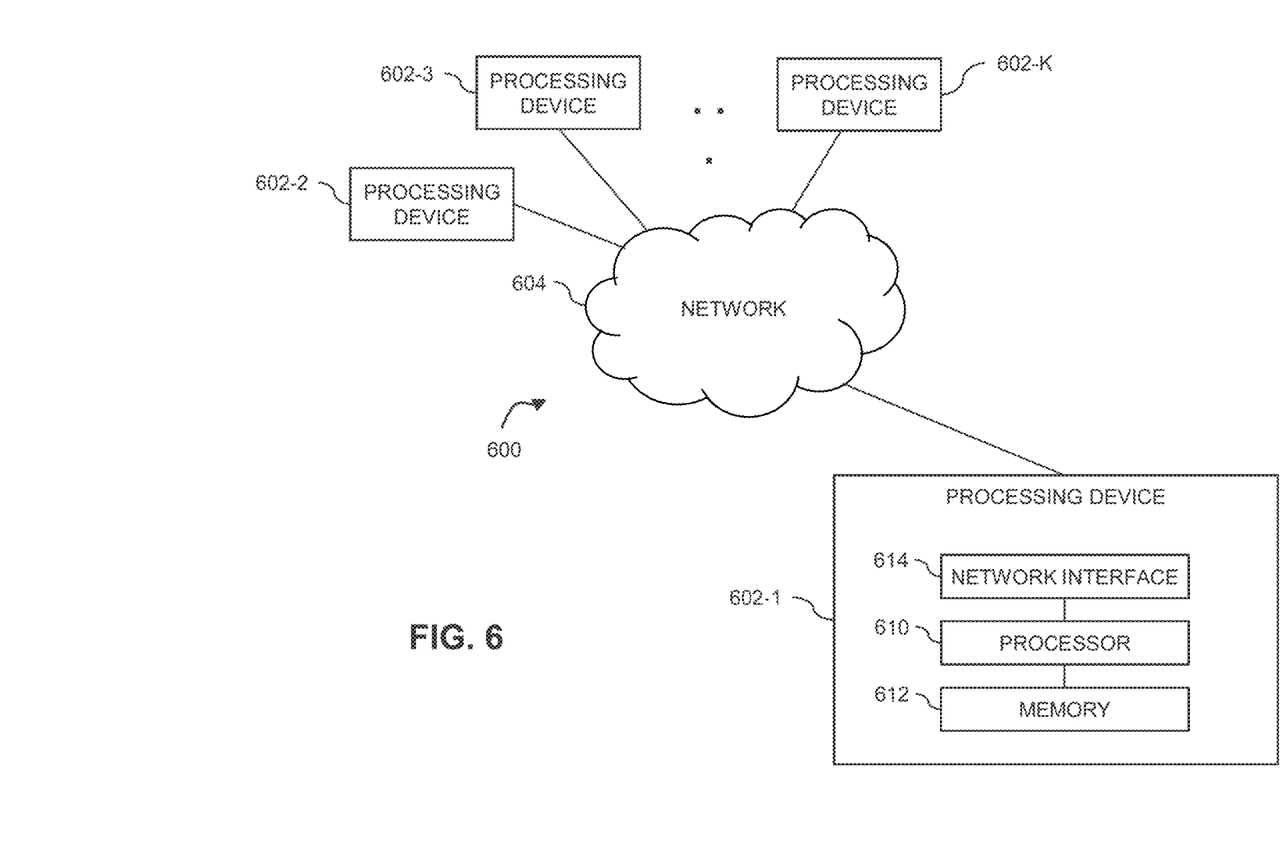
FIG. 6 illustrates a processing platform used to implement an email processing system, according to an illustrative embodiment.

FIG. 6 illustrates a processing platform used to implement an email processing system, according to an illustrative embodiment. At least portions of the email processing systems and processes shown in FIGS. 1-5 may be implemented using one or more processing platforms. In some embodiments, a given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one. In many embodiments, logic may be executed across one or more physical or virtual processors. In certain embodiments, a virtual processor may be mapped to and executed on or across a portion of one or more virtual or physical processors. An illustrative embodiment of a processing platform will now be described in greater detail in conjunction with FIG. 6.

As is apparent from the above, one or more of the processing modules or other components of the email processing systems and processes shown in FIGS. 1-5 may each run on a computer, server, storage device or other processing platform element. A given such element may be viewed as an example of what is more generally referred to herein as a "processing device." An example of such a processing platform is processing platform 600 shown in FIG. 6.

The processing platform 600 in this embodiment comprises a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Some networks utilized in a given embodiment may comprise high-speed local networks in which associated processing devices communicate with one another utilizing Peripheral Component Interconnect Express (PCIe) cards of those devices, and networking protocols such as InfiniBand, Gigabit Ethernet or Fibre Channel.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA) or other type of processing circuitry, as well as portions or combinations of such circuitry elements.

The memory 612 may comprise random access memory (RAM), read-only memory (ROM) or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered embodiments of the present disclosure. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 of the example embodiment of FIG. 6 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, this particular processing platform is presented by way of example only, and other embodiments may include additional or alternative processing platforms, as well as numerous distinct processing platforms in any combination, with each such platform comprising one or more computers, servers, storage devices or other processing devices.

For example, other processing platforms used to implement embodiments of the disclosure can comprise different types of virtualization infrastructure, in place of or in addition to virtualization infrastructure comprising virtual machines. Such virtualization infrastructure illustratively includes container-based virtualization infrastructure configured to provide Docker containers or other types of Linux containers (LXCs).

The containers may be associated with respective tenants of a multi-tenant environment of an information or email processing system(s), although in other embodiments a given tenant can have multiple containers. The containers may be utilized to implement a variety of different types of functionality within the system. For example, containers can be used to implement respective cloud compute nodes or cloud storage nodes of a cloud computing and storage system. The compute nodes or storage nodes may be associated with respective cloud tenants of a multi-tenant environment. Containers may be used in combination with other virtualization infrastructure such as virtual machines implemented using a hypervisor.

As another example, portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC. For example, portions of an email processing system of the type disclosed herein can be implemented utilizing converged infrastructure.

It should therefore be understood that in other embodiments different arrangements of additional or alternative elements may be used. In many embodiments, at least a subset of these elements may be collectively implemented on a common processing platform, or each such element may be implemented on a separate processing platform.

Also, in other embodiments, numerous other arrangements of computers, servers, storage devices or other components are possible in the email processing systems and processes described herein. Such components can communicate with other elements of the system over any type of network or other communication media.

As indicated previously, in some embodiments, components of email processing systems and processes as disclosed herein can be implemented at least in part in the form of one or more software programs stored in memory and executed by a processor of a processing device. For example, at least portions of the execution environment or other system components are illustratively implemented in one or more embodiments the form of software running on a processing platform comprising one or more processing devices.

It should again be emphasized that the above-described embodiments of the disclosure are presented for purposes of illustration only. Many variations and other alternative embodiments may be used. For example, the disclosed techniques are applicable to a wide variety of other types of email processing systems. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the embodiments. Numerous other alternative embodiments within the scope of the appended claims will be readily apparent to those skilled in the art.

What is claimed is:

1. A method performed by at least one processing device comprising a processor coupled to a memory, the method comprising:
   sending an email from a first email client;
   providing a user interface on the first email client;
   displaying on the user interface a plurality of potential responses to the email;
   wherein the plurality of potential responses comprise a worded response, an emoticon and an emoji;
   for given ones of the displayed plurality of potential responses, displaying on the user interface on the first email client a plurality of numerical counts on a portion of the user interface outside of a message display area, each of the plurality of numerical counts being associated with one of the displayed plurality of potential responses;
   representing a number of replies to the email including one of the displayed plurality of potential responses with a given numerical count of the plurality of numerical counts;
   providing a plurality of tabs on the user interface;
   processing a selection of a predetermined tab of the plurality of tabs to display the plurality of numerical counts on the portion of the user interface outside of the message display area;
   wherein a reply to the email on an email server of the first email client increases the given numerical count; and
   limiting reference to the reply to the email on the first email client to the increased count.

2. The method of claim 1, further comprising:
   providing a user interface on a second email client displaying the plurality of potential responses; and
   automatically generating at least one potential response of the plurality of potential responses, and displaying the automatically generated response on the user interface on the second email client for possible selection by a user.

3. The method of claim 2, wherein the automatic generation of the at least one potential response is performed using at least one of natural language processing and machine learning.

4. The method of claim 2, further comprising identifying a relationship between a sender and a recipient of the email, wherein the automatically generated response is based on the identified relationship.

5. The method of claim 2, further comprising identifying a position within an enterprise of a recipient of the email, wherein the automatically generated response is based on the identified position.

6. The method of claim 2, further comprising accessing an electronic calendar of a recipient of the email and identifying availability of the recipient, wherein the automatically generated response is based on the identified availability.

7. The method of claim 2, further comprising accessing electronic location information of a recipient of the email and identifying a location of the recipient, wherein the automatically generated response is based on the identified location.

8. The method of claim 1, further comprising downloading a summary of the replies to the email from the email server of the first email client.

9. The method of claim 1, wherein:
the reply to the email includes a given response; and
the method further comprises:
determining that the given response should not be displayed to a user of the first email client; and
substituting the given response with a different response based on the given response.

10. The method of claim 1, wherein:
the reply to the email includes a given response; and
the method further comprises
determining that the given response is not supported by the first email client; and
substituting the given response with a supported response based on the given response.

11. The method of claim 1, wherein the replies increase the given numerical count without being classified as email messages on the first email client.

12. A computer program product comprising a non-transitory processor-readable storage medium having stored therein program code of one or more software programs, wherein the program code when executed by at least one processing device cause the at least one processing device:
to send an email from a first email client;
to provide a user interface on the first email client;
to display on the user interface a plurality of potential responses to the email;
wherein the plurality of potential responses comprise a worded response, an emoticon and an emoji;
for given ones of the displayed plurality of potential responses, to display on the user interface on the first email client a plurality of numerical counts on a portion of the user interface outside of a message display area, each of the plurality of numerical counts being associated with one of the displayed plurality of potential responses;
to represent a number of replies to the email including one of the displayed plurality of potential responses with a given numerical count of the plurality of numerical counts;
to provide a plurality of tabs on the user interface;
to process a selection of a predetermined tab of the plurality of tabs to display the plurality of numerical counts on the portion of the user interface outside of the message display area;
wherein a reply to the email on an email server of the first email client increases the given numerical count; and
to limit reference to the reply to the email on the first email client to the increased count.

13. The computer program product of claim 12, wherein the replies increase the given numerical count without being classified as email messages on the first email client.

14. An apparatus comprising:
at least one processing device comprising a processor coupled to a memory;
the at least one processing device being configured:
to send an email from a first email client;
to provide a user interface on the first email client;
to display on the user interface a plurality of potential responses to the email;
wherein the plurality of potential responses comprise a worded response, an emoticon and an emoji;
for given ones of the displayed plurality of potential responses, to display on the user interface on the first email client a plurality of numerical counts on a portion of the user interface outside of a message display area, each of the plurality of numerical counts being associated with one of the displayed plurality of potential responses;
to represent a number of replies to the email including one of the displayed plurality of potential responses with a given numerical count of the plurality of numerical counts;
to provide a plurality of tabs on the user interface;
to process a selection of a predetermined tab of the plurality of tabs to display the plurality of numerical counts on the portion of the user interface outside of the message display area;
wherein a reply to the email on an email server of the first email client increases the given numerical count; and
to limit reference to the reply to the email on the first email client to the increased count.

15. The apparatus of claim 14, wherein the replies increase the given numerical count without being classified as email messages on the first email client.

* * * * *